US012647728B2

(12) United States Patent
Couleaud et al.

(10) Patent No.: US 12,647,728 B2
(45) Date of Patent: Jun. 2, 2026

(54) SYSTEMS AND METHODS FOR AUDIO SHARING

(71) Applicant: Adeia Guides Inc., San Jose, CA (US)

(72) Inventors: Jean-Yves Couleaud, Mission Viejo, CA (US); Charles Dasher, Lawrenceville, GA (US); Reda Harb, Tampa, FL (US)

(73) Assignee: Adeia Guides Inc., San Jose, CA (US)

( * ) Notice: Subject to any disclaimer, the term of this patent is extended or adjusted under 35 U.S.C. 154(b) by 265 days.

(21) Appl. No.: 18/622,008

(22) Filed: Mar. 29, 2024

(65) Prior Publication Data

US 2025/0310692 A1 Oct. 2, 2025

(51) Int. Cl.
*H04R 5/033* (2006.01)
*H04R 1/10* (2026.01)
*H04R 3/14* (2006.01)

(52) U.S. Cl.
CPC ............... *H04R 5/033* (2013.01); *H04R 1/10* (2013.01); *H04R 3/14* (2013.01); *H04R 2420/07* (2013.01)

(58) Field of Classification Search
CPC .... H04R 1/1041; H04R 2420/07; H04R 1/10; H04R 3/14; H04R 5/033; H04W 4/80
USPC ....................................... 381/74, 56–58, 314
See application file for complete search history.

(56) References Cited

U.S. PATENT DOCUMENTS

| | | | | |
|---|---|---|---|---|
| 9,912,978 | B2 | 3/2018 | Dudley | |
| 10,142,750 | B2 | 11/2018 | Hariharan et al. | |
| 10,299,300 | B1 * | 5/2019 | Young | H04R 3/12 |
| 10,588,167 | B1 * | 3/2020 | Chen | H04W 56/0015 |
| 11,778,363 | B2 | 10/2023 | Zhu et al. | |
| 11,818,781 | B2 * | 11/2023 | Jin | H04W 72/0446 |
| 12,353,789 | B2 * | 7/2025 | Kim | H04R 1/10 |
| 2006/0251277 | A1 * | 11/2006 | Cho | H04M 1/6066 381/311 |
| 2022/0070247 | A1 * | 3/2022 | Wang | G06F 3/165 |

OTHER PUBLICATIONS

Ferjan, M., "31+ Important Headphones Statistics & Facts (2024), Headphones Addict," available online at: <https://headphonesaddict.com/headphones.statistics/>, retrieved on Nov. 8, 2023, (pp. 28).

(Continued)

*Primary Examiner* — Lun-See Lao
(74) *Attorney, Agent, or Firm* — HG LAW LLP

(57) ABSTRACT

Systems and methods are provided for enabling audio sharing. Inertial data is monitored at a first headset, and a tap input is detected, based on the inertial data, by detecting a movement of the headset in a first direction and a subsequent deceleration above a threshold. It is detected, at the first headset, that it is within a threshold proximity to a second headset, or a computing device associated with the second headset. It is determined, based on a predetermined factor, that the first headset is to receive audio associated with the second headset, and pairing information is transmitted to the first headset. Authorization to pair the first headset to the computing device is requested and received at the second headset. The first headset is paired to the computing device using the pairing information, and the first headset and the second headset receive the same audio from the computing device.

20 Claims, 12 Drawing Sheets

(56) References Cited

OTHER PUBLICATIONS

NFC Forum, Bluetooth (Registered) Secure Simple Pairing Using NFC, Application Document Version 1.2, available online at : < https://manuals.plus/wp-content/sideloads/bluetooth-secure-simple-pairing-using-nfc-manual-original.pdf>, May 31, 2019, (40 pages).

Phiaton, NFC Bluetooth Pairing: What is it and What are the Benefits?, 900 Legacy • BT 120 NC • BT 460, available online at: <https://phiaton.com/blogs/audio/nfc-bluetooth-pairing-what-is-it-and-what-are-the-benefits>, May 26, 2017, (3 pages).

"Bluetooth Pairing Without User Confirmation" https://stackoverflow.com/questions/5885438/bluetooth-pairing-without-user-confirmation, 6 pages, Retrieved on Feb. 9, 2026.

* cited by examiner

SYSTEMS AND METHODS FOR AUDIO SHARING

The present disclosure is generally directed to systems and methods for audio sharing.

SUMMARY

With the proliferation of portable computing devices, such as smartphones, and a proliferation of wireless headphones (or headsets), consuming audio via wireless headphones has become a commonplace way to enjoy music, podcasts and/or other audio programs. However, consuming audio via wireless headphones makes it difficult to share with nearby friends and/or family audio that is currently being consumed. One may tell others what one is listening to so that they can then stream and/or play the audio themselves on their own device; however, this assumes that the other person has access to the same audio on their own device and, in any case, this will not be a synchronized experience. Where a wireless headset comprises, for example, two individual earbuds, one may not wish to share earbuds for, for example, hygienic reasons. Some wireless headsets, and any other audio device, may support Bluetooth multi-connection, which enables more than one headset to be paired to a single audio device; however, Bluetooth multi-connection requires access to an audio device providing audio to the headsets, such as a smartphone, and typically requires multiple pairing steps, limiting the ease of use.

To help address these problems, systems and methods are provided herein that enable two or more users of audio output devices (e.g., headset devices) to quickly start a session in which they listen to the same audio (e.g., originating from a single device of one of the users). This enables the users to easily share audio with each other (e.g., to quickly listen to the same song, watch the same video, etc.) without providing the audio via a speaker of the phone, thereby avoiding bothering people in the vicinity who may not want to listen to the audio. For example, many commuter trains offer "quiet cars" that prohibit playing audio by way of speakers. Using the disclosed techniques, users can easily share audio in quiet cars without violating rules about noise. Further, the described techniques enable the users to easily share audio with each other without forcing them to go through a tedious Bluetooth pairing process. In particular, the systems and methods described herein enable the sharing of audio between multiple headsets in response to a tap input. In an example system, a first user listens to music via their wireless earbuds and mobile device, for example via their AirPods and iPhone. The first user wishes to share the music with a second user. The second user taps one of their AirPods on one of the first user's AirPods. This tap is detected, and in response to the tap, it is detected that the AirPods are close to one another. Pairing information is transmitted to the second user's AirPods, the second user's AirPods pair with the iPhone, and the music is transmitted to the first and the second user's AirPods from the iPhone. In this manner, audio can be easily shared between users by simply tapping one headset on another headset.

In accordance with some aspects of the disclosure, a method is provided. In an embodiment, the method includes monitoring, at a first headset, inertial data, and determining that the first headset has received a tap input. The determining may comprise detecting: a movement of the first headset in a first direction based on the inertial data; and a subsequent deceleration of the first headset based on the inertial data, where the deceleration is above a threshold deceleration. For example, inertial data associated with a headset moving around in a bag may produce a deceleration that is below the threshold; however, inertial data associated with a first headset tapping another and stopping when it has made contact with a second headset may produce a deceleration that is above the threshold. Different headsets may have different inertial data associated with movements and, in some examples, inertial data may be captured in different scenarios in order to calibrate an appropriate threshold for the headset. In some examples, the threshold deceleration may be an absolute value, in other examples, a threshold deceleration may be associated with a detectable pattern that is identifiable from the inertial data. In response to determining the tap input, the first headset detects that the first headset is within a threshold proximity to a second headset or to a computing device associated with the second headset. For example, a threshold proximity may comprise a distance associated with two people sitting near to each other, but may exclude a distance associated with two people on different sides of a room. It is also determined that the first headset is to receive audio associated with the second headset based on a predetermined factor. In some examples, a predetermined factor may comprise a setting indicating that audio sharing is enabled. Pairing information is transmitted to the first headset and, at the respective second headset or computing device, authorization to pair the first headset to the computing device is requested. The authorization to pair the first headset to the computing device is received at the respective second headset or computing device, and the first headset is paired to the computing device using the pairing information. The first headset and the second headset receive the same audio from the computing device. Accordingly, using a quick tap input, the user of the second headset can quickly share audio of the computing device (originally paired with only the first headset in this example) with the user of the first headset.

In an example system, a first user has a pair of AirPods that the user is using to listen to music via their iPhone. A second user wishes to listen to the same music via their pair of Galaxy Buds. The second user taps one of their Galaxy Buds on one of the AirPods of the first user. A tap event between the two wireless earbuds is determined by detecting the movement of the Galaxy Bud in a first direction via an accelerometer, and a subsequent deceleration above a threshold via the accelerometer. The AirPods may also detect the tap event, for example, via a dirac variation of an accelerometer associated with the AirPods. In response to determining the tap input, the AirPods detect that they are within a threshold proximity to the Galaxy Buds, for example, via a near field communication (NFC) link. A determination, based on a predetermined factor, such as a setting selected by the first user, is made that the Galaxy Buds are to receive the audio that is being transmitted to the AirPods. Bluetooth pairing information is transmitted from the Galaxy Buds to the AirPods over, for example, the NFC link. The AirPods then transmit the pairing information to the iPhone over, for example, Bluetooth. Then, for example, at the AirPods a chime is heard indicating a request for authorization to pair the Galaxy Buds to the iPhone. Authorization to pair the Galaxy Buds to the iPhone is received at the AirPods, for example, via a touch event, and the Galaxy Buds are paired to the iPhone using the received pairing information. Following the pairing of the Galaxy Buds to the iPhone, the Galaxy Buds and the AirPods then receive the same music from the iPhone.

In another example system, the second user may tap one of their headphones (e.g., one of their Galaxy Buds) directly on the computing device (e.g., the iPhone) of the first user, rather than tapping a headphone (e.g., left AirPod earpiece) of the first user, in order to initiate the request for pairing and the subsequent authorization process. In some examples, the second user may tap one of their headphones (e.g., on of their Galaxy Buds) directly on a charging case associated with the headphones (e.g., AirPods) of the first user in order to initiate the request for pairing and the subsequent authorization process. In a similar manner, the authorization to pair the headphones (e.g., Galaxy Buds) of the second user may be received via a headphone (e.g., an AirPod) of the first user and/or the charging case of the headphones.

In some examples, a user interface (UI) may be generated for output at the computing device. For example, a graphical user interface may be generated for display at the iPhone of the first user. The UI may be generated in response to detecting the tap event between two different headsets, for example, between a Galaxy Bud and an AirPod. In another example, the UI may be generated in response to detecting the tap event between a headset and a computing device, for example between a Galaxy Bud and an iPhone. This computing device may be a computing device that is associated with a first user and is paired with a headset of the first user (e.g., the AirPods in this example). The UI may present user interface elements that enable input to be received with respect to different sharing options. For example, the user interface elements may be associated with one or more conditional sharing options. This may include, for example, enabling the sharing of audio associated with a particular application (i.e., without notification sounds), the sharing of audio for a preset, or selected, time period, such as 30 minutes, the sharing of application audio while the application is performing a particular action, for example, while the application is streaming and/or the sharing of the present and the next song being played by an application.

BRIEF DESCRIPTIONS OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

The above and other objects and advantages of the disclosure may be apparent upon consideration of the following detailed description, taken in conjunction with the accompanying drawings, in which.

DETAILED DESCRIPTION

As used herein, a headset may comprise a pair of wired or wireless headphones. A pair of headphones may comprise a pair of over-ear headphones that are physically joined together, such as the wireless Beats Studio Pro. A pair of headphones may also comprise a pair of wireless earbuds, such as a pair of AirPods and/or Galaxy buds. In other examples, headphones may be integrated into a device, such as an extended reality headset. A headphone, as used herein, may refer to a single component of a headset, such as a single AirPod and/or a single Galaxy bud.

A first headset may be paired to a computing device via a link, such as a Bluetooth link. Pairing information may include all the information usable to establish communication between a second Bluetooth headset and the computing device, without user interaction and without terminating an existing communication between the computing device and the first headset. In some examples, the Bluetooth pairing may require the distribution of secrets between computing devices. In some examples, Bluetooth pairing information may comprise a Bluetooth address of a computing device, a Bluetooth name of a computing device and/or a Bluetooth profile of a computing device.

Where a specific protocol is referred to, other protocols may be substituted. For example, where NFC is referred to, other short-range wireless communication (e.g., up to 2-4 inches) protocols that operate in a frequency band of 12-14 MHz with a bandwidth of 10-20 kHz may also be utilized. In another example, where Bluetooth is referred to, other medium-range wireless communication (e.g., up to 40 feet) protocols that operate in a frequency band of 2.2-2.6 GHz with a bandwidth of 1-3 MHz may also be utilized.

The disclosed methods and systems may be implemented on one or more devices, such as user devices and/or computing devices. As referred to herein, the device can be any device comprising a processor and memory, for example, a handheld computer, a mobile telephone, a portable video player, a portable music player, a portable gaming machine, a smartphone, a smartwatch, a smart speaker, an augmented reality headset, a mixed reality device, a virtual reality device, a gaming console, a vehicle infotainment headend or any other computing equipment, wireless device, and/or combination of the same.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, USB drive, DVD, CD, media card, register memory, processor cache, random access memory (RAM) and/or a solid-state drive.

Figure 1:
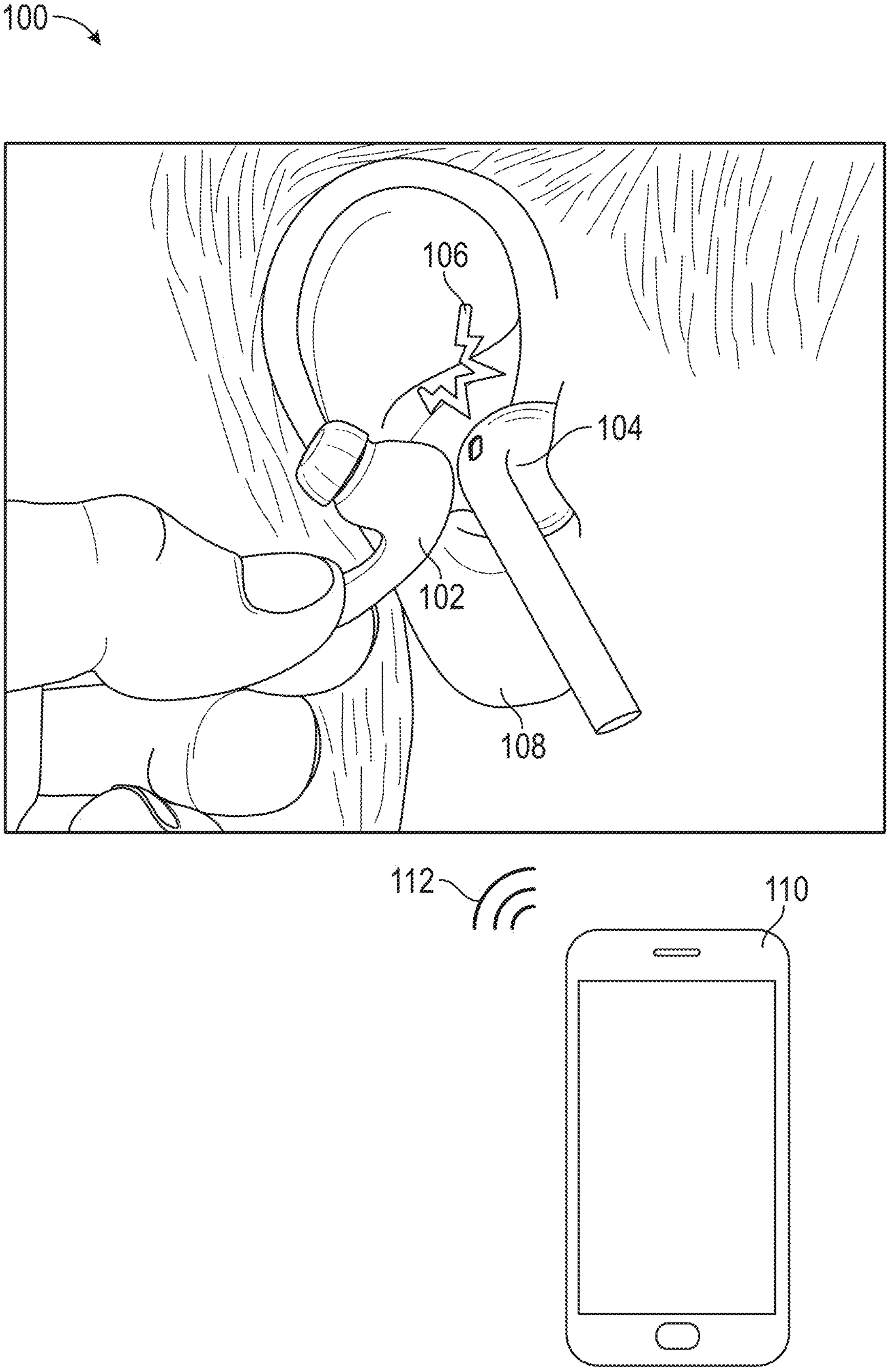
FIG. 1 shows an example environment for enabling audio sharing, in accordance with some embodiments of the disclosure.

FIG. 1 shows an example environment for enabling audio sharing, in accordance with some embodiments of the disclosure. The environment 100 comprises a first headphone 102, a second headphone 104 and a computing device 110. The first headphone 102 may be a wireless earbud of a first headset (i.e., a pair of wireless earbuds), and the second headphone 104 may be an AirPod of a second headset (i.e., a pair of AirPods). Although this example depicts earbuds and AirPods, any headset may be utilized. The computing device 110 may be a smartphone 110. In this example, a first user is listening to music via the second headset, comprising second headphone 104, which is connected to his smartphone 110 via a Bluetooth connection 112. The music is streamed from the smartphone 110 via the Bluetooth connection 112 to the second headset, comprising headphone 104. A second user wishes to listen to the music that the first user is listening to. In order to initiate music sharing, the second user taps a first headphone 102 on the second headphone 104, and a tap event 106 occurs when the second user brings the first headphone 102 into contact with the second headphone 104. In this example, the second headphone 104 is in an ear 108 of the first user; however, the second headphone 104 may not always be located in the ear 108 of a user.

The tap event 106 is detected using any of the methods described herein, and audio is shared with the second headset using any of the methods described herein. Upon detection of the tap event, the first headset comprising headphone 102 transmits, for example via NFC, pairing information to the second headset comprising headphone 104. The second headset transmits, for example via Bluetooth, the pairing information to the computing device 110, which utilizes the pairing information to pair with the first headset. For example, the tap event 106 between the first headphone 102 and the second headphone 104 is determined by detecting the movement of the first headphone 102 in a first direction via an accelerometer, and a subsequent deceleration above a threshold via the accelerometer. In response to determining the tap input, the second headphone 104 detects that it is within a threshold proximity to the first headphone 102, for example, via an NFC link. A determination, based on a predetermined factor, such as a setting selected by the first user, is made that the headphones of the first headset are to receive the audio that is being transmitted to the headphones of the second headset. Pairing information, such as Bluetooth pairing information, is transmitted to at least one of the headphones of the first headset and at, for example, at least one of the headphones of the second headset, a chime is heard indicating a request for authorization to pair the headphones of the first headset to the smartphone 110. Authorization to pair the headphones of the first headset to the smartphone 110 is received through at least one of the headphones of the second headset, for example, via a touch event, and the headphones of the first headset are paired to the smartphone 110 using the received pairing information. Following the pairing of the headphones of the first headset to the smartphone 110, the headphones of the first headset and the headphones of the second headset then receive the same audio from the smartphone 110. Accordingly, using a quick tap input, the user of the second headset can quickly share audio of the computing device (originally paired with only the second headset in this example) with the user of the first headset.

In variations of the example environment depicted in FIG. 1, the first headphone 102 may be tapped directly on computing device 110 in order to initiate the sharing. In another example, the first headphone 102 may be tapped directly on a charging device associated with computing device 110. In these examples, as before, the second user wishes to listen to the music that the first user is listening to. In order to initiate music sharing, the second user taps a first headphone 102 on the computing device 110, or a charging device associated with the computing device 110, and a tap event 106 occurs when the second user brings the first headphone 102 into contact with the computing device 110, or a charging device associated with the computing device 110.

The tap event 106 is detected using any of the methods described herein, and audio is shared with the second headset using any of the methods described herein. Upon detection of the tap event, the first headset comprising headphone 102 transmits, for example via NFC, pairing information to the second headset comprising headphone 104. The second headset transmits, for example via Bluetooth, the pairing information to the computing device 110, which utilizes the pairing information to pair with the first headset. For example, the tap event 106 between the first headphone 102 and the computing device 110, or a charging device associated with the computing device 110, is determined by detecting the movement of the first headphone 102 in a first direction via an accelerometer, and a subsequent deceleration above a threshold via the accelerometer. In response to determining the tap input, the computing device 110, a charging device associated with the computing device 110 or a case associated with the second headset, detects that it is within a threshold proximity to the first headphone 102, for example, via an NFC link. A determination, based on a predetermined factor, such as a setting selected by the first user, is made that the headphones of the first headset are to receive the audio that is being transmitted to the headphones of the second headset. Pairing information, such as Bluetooth pairing information is transmitted to at least one of the headphones of the first headset and at, for example, at least one of the headphones of the second headset, a chime is heard indicating a request for authorization to pair the headphones of the first headset to the smartphone 110. Authorization to pair the headphones of the first headset to the smartphone 110 is received at through at least one of the headphones of the second headset, for example, via a touch event, and the headphones of the first headset are paired to the smartphone 110 using the received pairing information. Following the pairing of the headphones of the first headset to the smartphone 110, the headphones of the first headset and the headphones of the second headset then receive the same audio from the smartphone 110. Accordingly, using a quick tap input, the user of the computing device 110 can quickly share audio of the computing device (originally paired with only the second headset in this example) with the user of the first headset.

In some examples, the first and second headphones 102, 104 may comprise modules and/or circuitry that enable contact detection and short-range data communication, allowing two pairs of headsets to be associated with one another via contacting a headphone of a first headset with a headphone of a second headset. In some examples, multi-connection Bluetooth may be utilized to distribute audio from one computing device to a plurality of wireless audio headsets that have been associated by contacting individual headphones of the headsets.

In another example, a wireless headset may be fitted with a contact detection sensor (which may provide inertial data), NFC circuitry, a Bluetooth communication transceiver and computer circuitry. The computer circuitry may include computing, memory, storage and input/output path to all the other elements of the headsets including elements such as the speakers. The contact detection sensor may also be coupled with a motion sensor and/or a touch sensor in order to differentiate a headset being contacted on from a headset initiating the contact. This enables a determination of which headset will be linked to which audio device.

The contact detection sensor may comprise an accelerometer that is configured to detect a touch event, or a shock. A touch event may be registered via the accelerometer as a signal close to a Dirac. Upon detection of the touch event, the contact detection module may trigger a discrete signal to the computer circuitry. Upon detection of such a signal, the computer circuitry may then try to establish which device (or headphones) made the contact and which received the contact. The computer circuitry may, for example, start looking at whether or not a Bluetooth connection is already established and active with a first audio device. An active Bluetooth connection may comprise a Bluetooth connection wherein audio is being transmitted to the headset as opposed to a connection wherein, for example, only keep alive messages are being transmitted to the headset. If the computer circuitry does not detect an active connection, the computer circuitry may place itself in "contactor" mode. If the computer circuitry does detect an active connection, the computer circuitry may then try to establish if the headset is being held or if the headset is being worn. Using a combination of motion sensors and contact and/or touch sensors, the headset may determine that it is being held, and that, prior to the contact detection, the headset was moving at a higher speed for a threshold period of time, for example ten seconds, before the contact. In this example, detecting motion variations rather than detecting absolute motion enables the motion detection to be performed when both headsets are moving, such as when they are in a vehicle or while a user wearing a headset is walking.

In a further example, rather than using motion sensors, the radio frequency (RF) environment of the pair of earbuds that compose a headset may be monitored. By monitoring for variation in RF properties such as received signal strength indicator (RSSI) and/or Channel State Information (CSI) from one headphone of a pair of headphones to a second headphone of the pair of headphones, the headset may be able to infer the relative distance between headphones, and hence may be able to distinguish between a headset whose earbuds are in-ear and a headset that is in motion. Upon detecting that the headset is moving (relatively), the headset may put itself in "contactor" mode. If the headset does not detect that it is moving, it may put itself into "contactee" mode, and emit pairing information via an NFC link. Symmetrically, the device in "contactor" mode may start listening on an NFC link for pairing information.

In some examples, by implementing a two-step approach comprising detecting a touch event, such as a shock, and then monitoring for NFC enables battery usage to be reduced, when compared to continuously monitoring for NFC, which may put a greater power drain on a headset.

Upon receiving the pairing information, the contactee headset may then generate an output indicating that another headset is attempting to establish a connection. For example, the headset may generate an aural indication that a connection request is pending. The aural indication may be generated directly by the headset, and/or it may be generated by a computing device, such as an audio device, that it is already connected to. Where the aural indication is generated by the computing device, the headset may transfer an indication of the connection request to the computing device via, for example, a Bluetooth data link. In some examples, the aural indication may be programmable, for example, by a user. If the aural indication is generated by the computing device, it may be programmable directly on the computing device. If the aural indication is generated by the headset, an application running on the computing device may be utilized to program the aural indication. In other examples, the aural indication may include an identification of the contactor device. In this example, in addition to receiving pairing information, the contactee headset may also transmit device information on an NFC channel, and the contactor may receive the transmitted device information.

In some examples, the contactee headset may request permission, or authorization, before establishing a new connection to a second headset. Requesting permission may comprise receiving an input on the computing device associated with the permission being granted. In some examples, the contactee headset may then wait for a confirmation event before requesting the contactee device to establish a connection with the contactor headset. Such a confirmation event may comprise the reception of a tap input on the earphone, or earbud, opposite to the earphone, or earbud, that detected the initial contact. In some examples, an application running on the computing device may be configured to enable other confirmation "gestures" to be programmed, such as a double tap on the headset. The headset may also allow a confirmation window time (i.e., 5, 10 or 15 seconds for example) to be programmed, which would be a time-out after which, if no confirmation input is received, the connection with the contactor may not be established. In other examples, the headset may enable all connection attempts to be automatically accepted by using the contact method described herein and as a setting programmed on their computing device that has been transferred to their headset. In another example, an established connection may be added to a trusted connection list, which may enable the headset connection to be automatically established without an explicit confirmation input if it is detected again. There is hence a need, in some examples, to unpair devices that were initially paired, but are not part of the trusted connection list. In some examples, ephemeral authorization can be granted to connect to a first device, and permanent authorization can be granted to connect to a second device. When the authorization is ephemeral, pairing information may be discarded once the connection has terminated. This process may be enabled as part of an inter-ear communication protocol at which true wireless earbuds operate. This inter-ear communication protocol may be used to establish a master/slave relationship between both earbuds as well as selecting which microphone audio gets routed back to the computing device (where earphones, or earbuds, comprise a microphone). A messaging structure may be enabled between earphones, or earbuds, of a headset, which may be used to enable one headphone, or earbud, to inform the other headphone, or earbud, of a gesture action and/or signal a pairing request.

In some examples, once the contactor headset has received confirmation that the connection is authorized, the contactor headset may then establish an audio connection, such as a Bluetooth audio connection, with the computing device (e.g., an audio device). The audio device may also receive information regarding the "contactor" headset from the "contactee" headset that it is already connected to, in order to facilitate the establishment of a new connection with the contactor headset. In some examples, such information may include an shared secret as well, so that no user action is required in order to establish the connection.

In some examples, a second user may be able to share the audio of a first user, without any interaction from the first user. The may be utilized, for example, as a parental control feature. A second user may be authorized via a parental control interface and may be authorized to manage a device that is being used by a first user to listen to audio via a headset. In an example, Mom's AirPods may be utilized to listen to the audio that is being transmitted to AirPods that are currently connected to a computing device device that is managed by the mother (e.g., mom is designated as a parent/guardian). Other parental control features may enable a user to control timing associated with audio sharing (e.g., a child may only be able to share audio at certain times of day), users that an account can share with (e.g., a child may only be able to share their audio with other family members) and/or the type of audio that can be shared (e.g., a certain age rating and/or content type may be shareable).

In some examples, a preference may be set such that a detected tap may be ignored if, for example, the headset that is tapping does not belong to someone on a preset list, such as a contact list and/or phone book. In order to enable such a feature, a request for approval, such as during Bluetooth pairing, may include information about the requester.

In some examples, if the contactor headset was paired and active with a second computing device before it initiated the contact with the contactee headset, it may, or may not, terminate the link with the second computing device. If the contactor headset does terminate the link, it may then re-establish the link automatically once the temporary connection to the contactee computing device is terminated. If the contactor headset does not terminate the link, the contactor headset may automatically select which audio to render based on its awareness of the temporary connection (in some examples, it may then automatically revert to its original audio once the temporary connection is terminated). The contactor headset may keep two connections active (one with the contactor device and one with the contactee device), and the contactor headset may also be able to mix both audio from both devices based on priority. For example, the contactor headset may generate an output, such as an audible output, that a phone call is incoming while the contactee audio is being output, by mixing ringtone audio from the contactor device with audio from the contactee device. In another example, the audio from the contactee device may be interrupted (i.e., temporarily paused and/or muted) by the ringtone audio. In addition, to save on battery life on the contactor computing device, the contactor headset may instruct the contactor computing device to suspend audio streaming once the contactor headset connection to the contactee computing device is established. The audio may resume automatically once the contactor headset connection to the contactee computing device is terminated.

Figure 2:
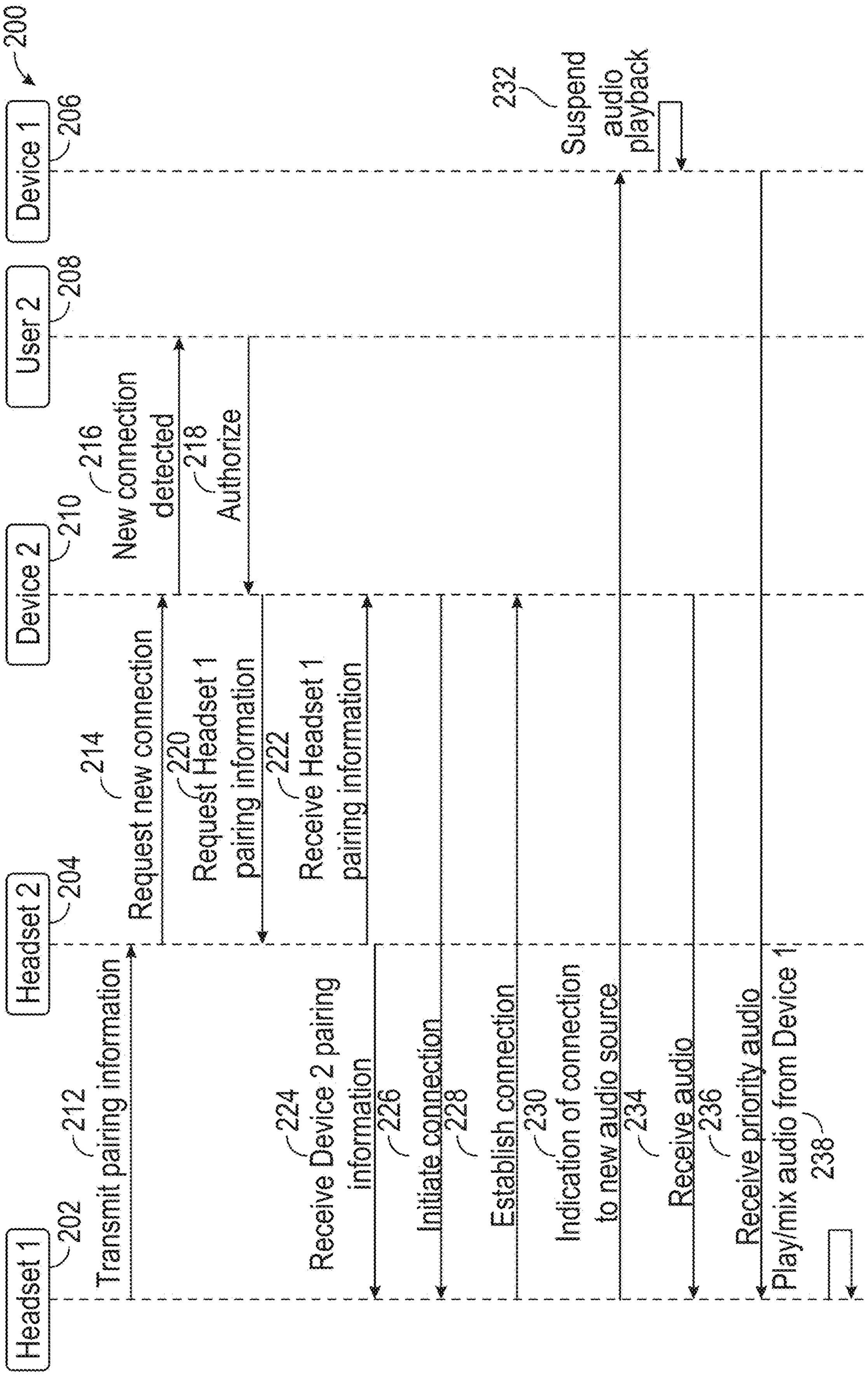
FIG. 2 shows a sequence of illustrative steps for enabling audio sharing, in accordance with some embodiments of the disclosure.

FIG. 2 shows a sequence of illustrative steps for enabling audio sharing, in accordance with some embodiments of the disclosure. The sequence 200 comprises a first headset 202, a second headset 204, a first computing device 206, a second computing device 210, a first user (not shown) and a second user 208. The first and second headsets 202, 204 may be, for example, pairs of wireless headphones, each comprising a pair of wireless earbuds. The first and second devices 206, 210 may be, for example, smartphones.

The first user initiates the sequence by, for example, tapping a headphone of the first headset 202 on a headphone of the second headset 204. In this example, the first headset 202 is currently receiving audio from the first computing device 206. At 212, pairing information is transmitted from the first headset 202 to the second headset 204. This may occur, for example, via NFC. In other examples, pairing information may be transmitted and/or received from the first and/or second devices 206, 210, for example, where a headphone of the first headset 202 is tapped on a device, rather than on a headphone of the second headset 204. In some examples, the headphone of the first headset 202 may be tapped on a case associated with the second headset 204. At 214, a request for a new connection is transmitted from the second headset 204 to the second computing device 210. This may occur, for example, via Bluetooth. At 216, a request to authorize a new connection is, for example, generated for output, at the second computing device 210. In one example, the request may comprise a chime that is generated for output. In other examples, the request may be a notification displayed on a screen of the second computing device 210 and/or an audio request output via a speaker of the second computing device 210. At 218, input is received at the second computing device 210 authorizing the new connection. For example, the input may be one or more touch inputs received via a touchscreen of the second computing device 210 and/or a spoken confirmation received via a microphone of the second computing device 210.

At 220, a request for the first headset 202 pairing information, which was received by the second headset 204, is transmitted from the second computing device 210 to the second headset 204. This may occur, for example, via Bluetooth. In response to this request, at 222, the second headset 204 transmits the first headset 202 pairing information to the second computing device 210. This may also occur, for example, via Bluetooth. At 224, pairing information for the second computing device 210 is transmitted from the second headset 204 to the first headset 202. This may occur, for example, via NFC. At 226, the second computing device 210 initiates a connection between the second computing device 210 and the first headset 202, and at 228, a connection between the first headset 202 and the second computing device 210 is established. These steps may occur, for example, via Bluetooth. At 230, the first headset transmits an indication that it is connecting to a new audio source to the first computing device 206, for example, via Bluetooth, and at 232, the first computing device 206 suspends audio playback to the first headset 202. At 234, the first headset receives audio, such as shared music, from the second computing device 210. This may occur, for example, via Bluetooth. At 236, priority audio, such as a phone call, is received at the first computing device 206, for example, via Bluetooth, and the priority audio is received at the first headset 202 from the first computing device 206. At 238, the first headset 202 outputs the audio from the first computing device 206, and/or mixes the audio from the first computing device 206 with the audio from the second computing device 210.

Figure 3:
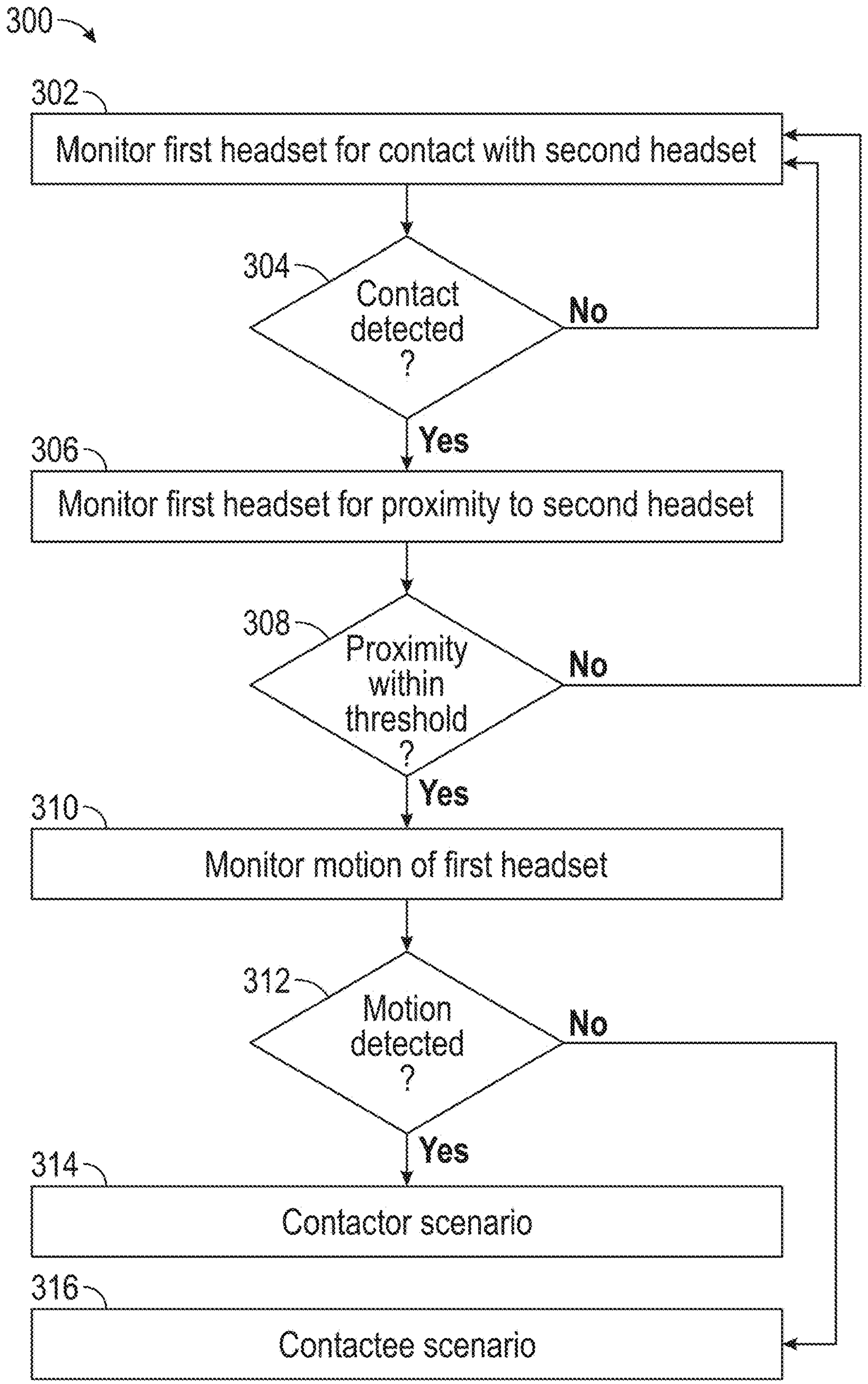
FIG. 3 shows a flowchart of illustrative steps for enabling audio sharing, in accordance with some embodiments of the disclosure.

FIG. 3 shows a flowchart of illustrative steps for enabling audio sharing, in accordance with some embodiments of the disclosure. FIG. 3 illustrates how the contactor/contactee state may be determined using relative motion monitoring. This "monitor for motion" process may be implemented as a background task that runs regardless of the proximity and contact detection processes. Process 300 may be implemented, in whole or in part, on any of the computing devices mentioned herein. In addition, one or more actions of the process 300 may be incorporated into or combined with one or more actions of any other processes or embodiments described herein.

At step 302, a first headset is monitored for contact with a second headset. At 304, it is determined whether contact between the first and second headsets has been detected. If, at 304, no contact is detected, the process loops back to step 302. If, at 304, contact is detected, the process proceeds to step 306, where the first headset is monitored for proximity to the second headset. At step 308, it is determined whether the proximity of the first headset to the second headset is within a threshold distance. For example, a threshold distance may comprise a distance associated with two people sitting near to each other, but may exclude a distance associated with two people on different sides of a room. If the first headset is not within the threshold distance, then the process loops back to step 302. If the first headset is within the threshold distance, then the process proceeds to step 310, where motion of the first headset is monitored. In some examples, at step 310, it may be detected that one or more of the headphones of the contactor headset are not in the ear of a user, whereas it may be detected that one or more of the headphones of the contactee headset are in the ear of the user. This may be utilized instead of, or as well as, monitoring motion of the first headset. The process may comprise a step to check if a headset is already receiving audio, and if the headset is not already receiving audio, then the process may jump directly to contactor scenario. This may, for example, reduce the power consumption of wireless headsets and hence prolong the battery life of such headsets. At 312, it is determined whether motion of the first headset has been detected. If, at 312, it is determined that motion has been detected, then the process proceeds to step 314, where a contactor scenario is initiated. If, at 312, it is determined that motion has not been detected, then the process proceeds to step 316, where a contactee scenario is initiated. The same process 300 may run on both the contactor headset and the contactee headset, but the end path may be different. In some examples, step 310 and/or step 312 may be run in the background.

Once a connection is established between the contactor headset and the contactee computing device, either the contactee or the contactor user may terminate the connection by a contact gesture (i.e., a touch event), or a gesture similar, but not necessarily identical, to the one used to confirm the connection. For example, a user may double-tap on either of their headphones (or earbuds) to terminate a temporary connection. If the contactee initiates the termination, the headset may inform the computing device to sever the connection. If the contactor initiates the termination, the computing device may sever the connection directly. In some examples, the contactor headset may automatically re-establish a connection or resume operation with their original computing device after the temporary connection is terminated. In some examples, the termination may be activated from the contactee computing device, such as via a input received at a UI generated for output at the contactee computing device.

Figure 4:
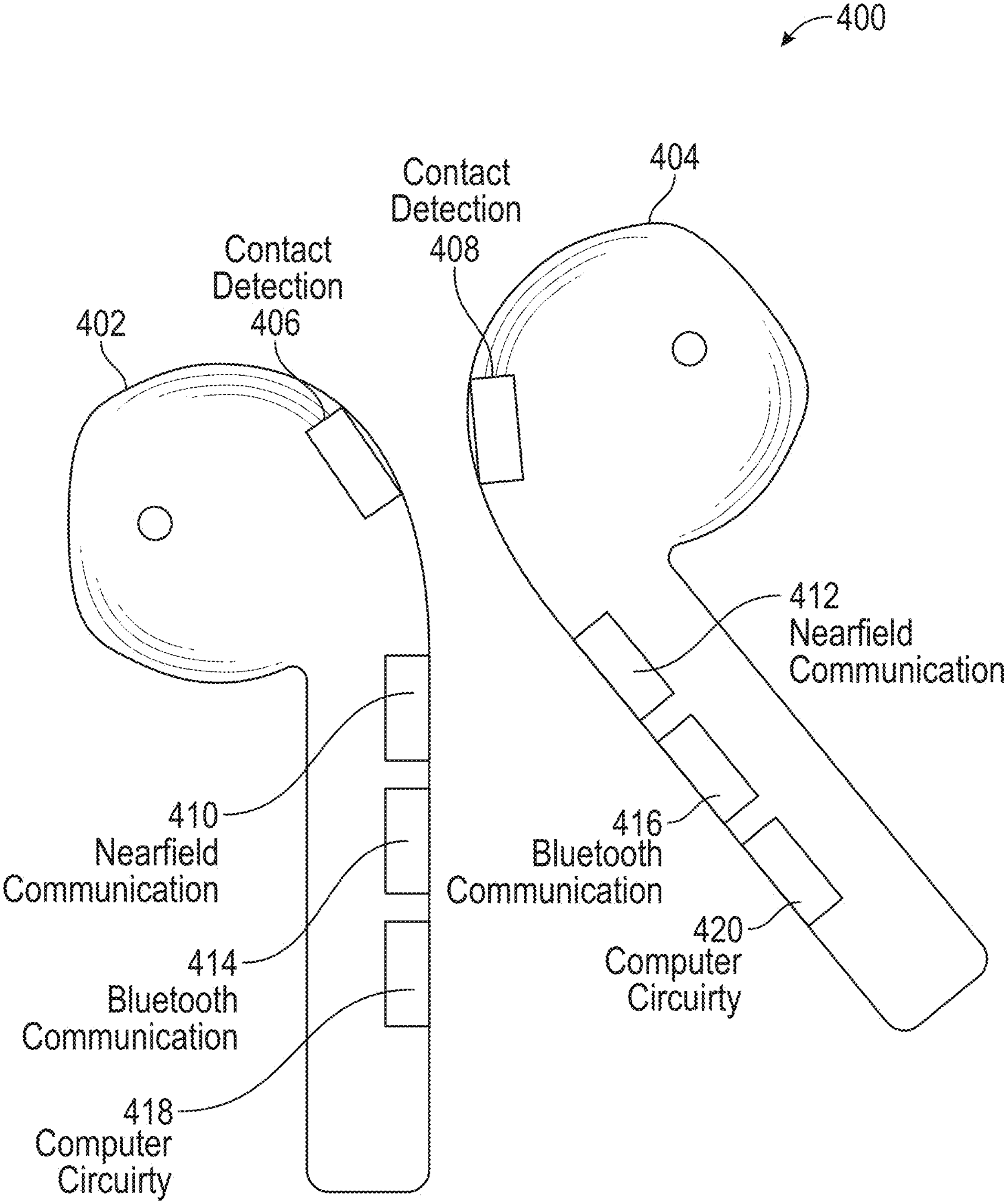
FIG. 4 shows another example environment for enabling audio sharing, in accordance with some embodiments of the disclosure.

FIG. 4 shows another example environment for enabling audio sharing, in accordance with some embodiments of the disclosure. The environment 400 comprises a first headphone 402 and a second headphone 404. The first headphone 402 comprises contact detection circuitry 406, NFC circuitry 410, Bluetooth communication circuitry 414 and computer circuitry 418. The second headphone 404 comprises second contact detection circuitry 408, second NFC circuitry 412, second Bluetooth communication circuitry 416 and second computer circuitry 420.

The contact detection circuitry, or modules, 406, 408 may comprise one or more inertial measurement unit sensors and one or more capacitance measurement sensors. The NFC circuitry, or modules, 410, 412 may comprise sets of transceivers utilizing the NFC standard in the industrial, scientific and medical radio bands, ultra-wide band communication, and/or near field magnetic induction communication. The Bluetooth communication circuitry, or modules, 414, 416 may support multi-connection protocols, such as Bluetooth low energy 5.2 and above. The computer circuitry 418, 420 may comprise a controller. The computer circuitry 418, 420 may be a single board computer that includes all the execution resources (for example, one or more central processing units and memory, such as random access memory) and instructions to enable the operation of the headset including the operations described herein.

In some other examples, a visual indicator may be used to signal a successful pairing. A multicolor light emitting diode (LED), or a set of multicolor-LEDs, may be used to identify headsets that are paired to the same audio device. For example, a first user may select a color for their sharable headset LEDs, programmable via their computing device (such as a smartphone). A second user may have chosen a different color for their headset LED, but upon contacting the first user's headset using the methods described herein, and after the communication between the first user's device and the second user's headset is automatically established via one or more of the methods discussed herein, the second user's headset color may be changed to the first user's headset color.

In another example, a user may limit the number of headsets that can associate with their computing device via a setting on their computing device. In another example, a user of a computing device may limit the applications that can share audio using the methods described herein. For example, a user may activate the headset sharing feature for their music streaming service, but the user may disable it for telephone calls. This may be performed via a setting and/or preference on the computing device.

In an example, a Bluetooth connection between the first computing device and the second headset may be temporary and may be controlled by ephemeral secrets. Upon termination of either of the communication between the device and the headsets, the communication may be re-established by contact pairing as described herein.

In another example, when a first user terminates the connection between their first computing device and their first headset, the first computing device automatically severs the connection between itself and the second headset.

In a further example, upon detection of a contact and the determination of a second headset proximity, the first and second headsets may respectively inform the first and second computing devices that they are connected to that a new connection needs to be established. The second and first computing devices may then determine which headset needs to be dropped and which needs to be connected. This represents, for example, moving the determination of the "contactor" and the "contactee" as defined earlier from the headsets to the devices, thus potentially saving on the processing power in the headsets which, is beneficial for size, weight and battery life considerations.

In some other embodiments, if the computing devices or headsets cannot agree on a "contactee"/"contactor" attribution, they may decide to randomly elect a "contactor" and a "contactee" and/or generate a request for input, such as via a notification that is generated for output at one or more of the computing devices and/or at the headsets themselves. The notification may, for example, comprise a chime that is generated for output at both of the headsets and the contactee may be attributed as the headset at which an input, such as a tap, is received.

In another example, upon establishing a connection with a second headset, a user of a first device may instruct said device to generate for the second headset a different audio than that for the first headset. In some examples, the audio may comprise a totally different program and/or a volume adjustment. In other examples, a volume adjustment may be controlled by a default setting on the contactor computing device, such as "Use streaming device audio volume for shared audio connections" or "Use my current volume for audio connections." Audio volume preference information may be loaded into the contactor headset by the contactor computing device and exchanged between the contactor headset and the contactee computing device to generate the personalized audio.

In a further example, contact detection may involve measuring a magnetic field and/or induction currents caused by solenoid-type elements installed within the headset in lieu of an accelerometer (or in complement thereof). In another example, contact detection may comprise detecting capacitance, inductance and/or a resistance change when a headset installed in an ear and/or held between fingers is put in contact with another headset that is held between fingers.

If a contactor headset has established a connection to a contactee computing device, it may then in turn be contacted to establish a new connection with a new contactor headset and so on.

In some examples, the contact (i.e., the tap input) is not limited to a headphone-to-headphone interaction, such as when a first user holds an AirPod and taps it on an AirPod of a second user. In some examples, a user that is requesting the audio sharing may tap their headphone on the source of the audio (i.e., a computing device such as an iPhone or an iPad) in order to auto-initiate the audio sharing feature.

In some examples, audio sharing may be enabled only when certain apps are running (e.g., Spotify). In other examples, audio sharing may limit this feature to certain contacts (e.g., mom, sister and/or wife) by identifying the headset that is trying to gain access to the audio stream, and identifying a link between that headset and a contact.

Figure 5:
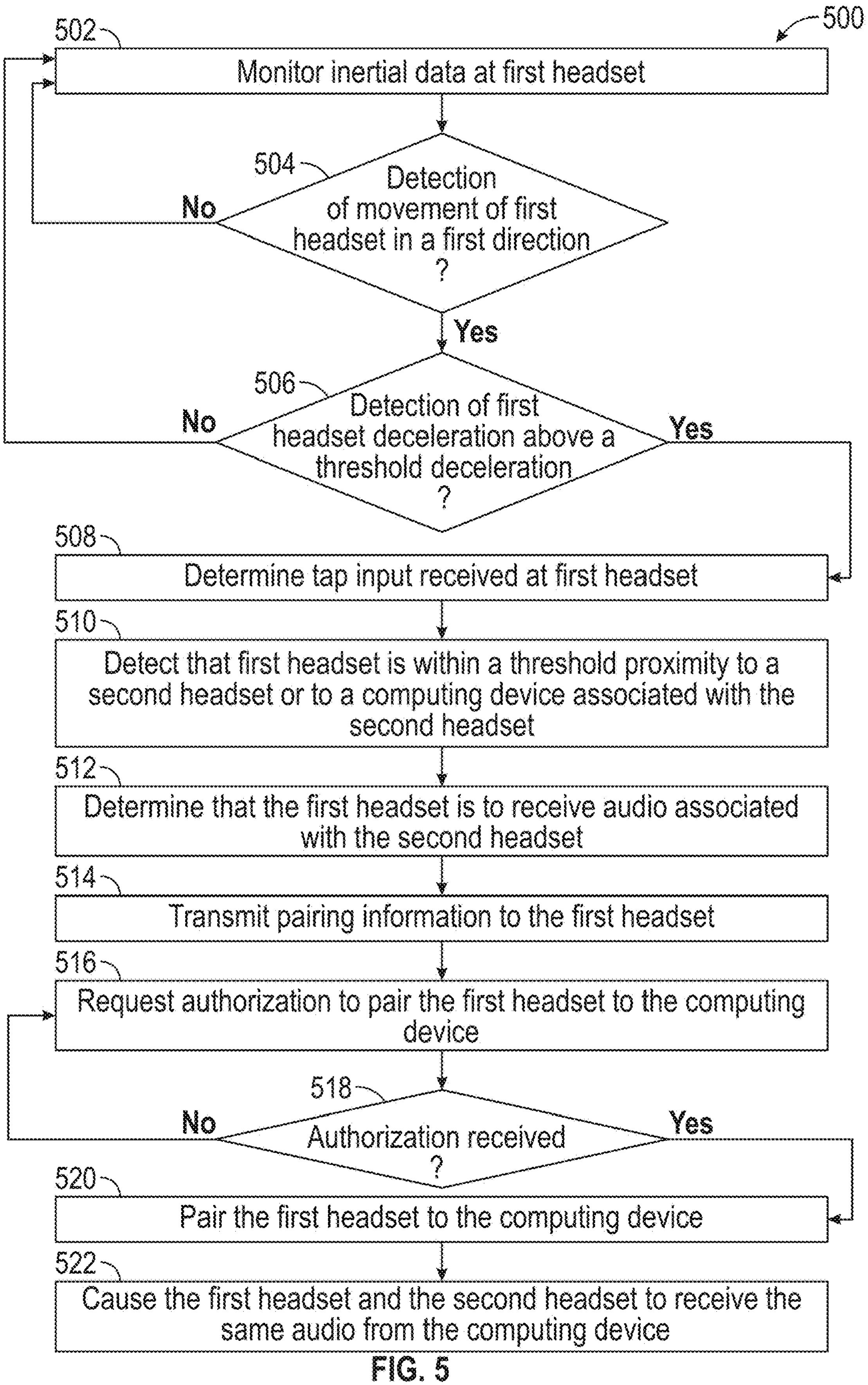
FIG. 5 shows another flowchart of illustrative steps for enabling audio sharing, in accordance with some embodiments of the disclosure.

FIG. 5 shows another flowchart of illustrative steps for enabling audio sharing, in accordance with some embodiments of the disclosure. Process 500 may be implemented, in whole or in part, on any of the computing devices mentioned herein. In addition, one or more actions of the process 500 may be incorporated into or combined with one or more actions of any other processes or embodiments described herein.

At step 502, inertial data is monitored at a first headset, for example, via an accelerometer located within at least one headphone of the first headset. The first headset may comprise, for example, a pair of AirPods. At 504, it is detected whether there has been a movement of the first headset in a first direction. For example, it is detected whether there has been a movement of a first headphone of the first headset. If no movement is detected, then the process loops back to step 502. If movement is detected, then the process proceeds to step 506, where it is detected whether a deceleration of the first headset is above a threshold deceleration. For example, it is detected whether there has been a deceleration of the first headphone above the threshold deceleration. If no deceleration above the threshold deceleration is detected, then the process loops back to 502. If a deceleration above the threshold deceleration is detected, then the process proceeds to step 508, where it is determined that a tap input has been received at the first headset. At 510, it is detected that the first headset (and/or a first headphone of the first headset) is within a threshold proximity to a second headset (and/or a first headphone of the second headset) or to a computing device, such as a smartphone, associated with the second headset. The second headset may comprise, for example, a pair of wireless earbuds. The proximity detection may take place, for example, via NFC. At 512, it is determined that the first headset is to receive audio associated with the second headset. For example, a song that is playing through the second headset that is being received from the computing device via, for example, Bluetooth.

At 514, pairing information is transmitted to the first headset, and at 516, authorization to pair the first headset to the computing device is requested. For example, the pairing information may be transmitted to the first headset via Bluetooth, and the pairing information may be transmitted from the second headset to the first headset. The request for authorization may be, for example, a notification displayed on a screen of the smartphone and/or an audio request output via a speaker of the smartphone. This request for authorization may take place, for example, via NFC. At 518, it is determined whether authorization has been received. If authorization has not been received, the process loops back to step 516. If authorization has been received, then the process proceeds to step 520, where the first headset is paired to the computing device, and a communication channel is established. For example, authorization may be received via an input at the computing device. The input may be, for example, one or more touch inputs received via a touchscreen of the computing device and/or a spoken confirmation received via a microphone of the computing device. The first headset may be, for example, paired to the smartphone via Bluetooth. At 522, the first headset and the second headset are caused to receive the same audio from the computing device. For example, the AirPods and the wireless earbuds receive the same song from the smartphone via Bluetooth. Accordingly, using a quick tap input, the user of the second headset can quickly share audio of the computing device with the user of the first headset.

Figure 6:
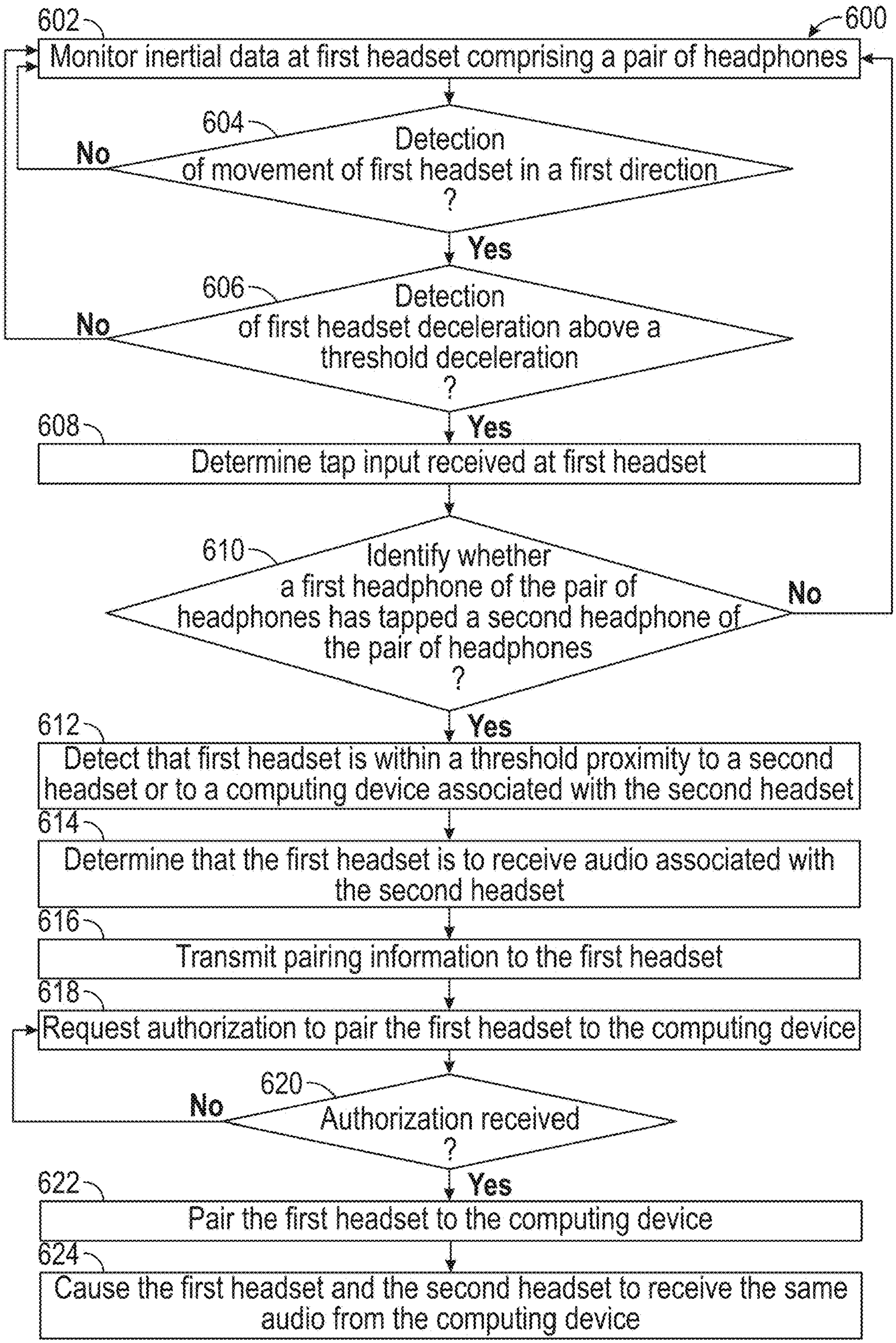
FIG. 6 shows another flowchart of illustrative steps for enabling audio sharing, in accordance with some embodiments of the disclosure.

FIG. 6 shows another flowchart of illustrative steps for enabling audio sharing, in accordance with some embodiments of the disclosure. Process 600 may be implemented, in whole or in part, on any of the computing devices mentioned herein. In addition, one or more actions of the process 600 may be incorporated into or combined with one or more actions of any other processes or embodiments described herein.

At step 602, inertial data is monitored at a first headset, for example, via an accelerometer located within at least one headphone of the first headset. The first headset may comprise, for example, a pair of AirPods. At 604, it is detected whether there has been a movement of the first headset in a first direction. For example, it is detected whether there has been a movement of a first headphone of the first headset. If no movement is detected, then the process loops back to step 602. If movement is detected, then the process proceeds to step 606, where it is detected whether a deceleration of the first headset is above a threshold deceleration. For example, it is detected whether there has been a deceleration of the first headphone above the threshold deceleration. If no deceleration above the threshold deceleration is detected, then the process loops back to 602. If a deceleration above the threshold deceleration is detected, then the process proceeds to step 608, where it is determined that a tap input has been received at the first headset. At 610, it is identified whether a first headphone of the pair of headphones has tapped a second headphone of the pair of headphones. This may take place, for example, by receiving an identifier of a first headphone of the pair of headphones via near field communication in response to the determination of a tap event and comparing the identifier to an identifier of the second headphone of the pair of headphones. This enables, for example, the system to differentiate among a tap between headphones of the same pair of headphones, and a tap between headphones of two different pairs of headphones, as a user will not need to share audio between headphones of the same pair of headphones.

At 612, it is detected that the first headset (and/or a first headphone of the first headset) is within a threshold proximity to a second headset (and/or a first headphone of the second headset) or to a computing device, such as a smartphone, associated with the second headset. The second headset may comprise, for example, a pair of wireless earbuds. The proximity detection may take place, for example, via NFC. At 614, it is determined that the first headset is to receive audio associated with the second headset, for example a song that is playing through the second headset that is being received from the computing device via, for example, Bluetooth. At 616, pairing information is transmitted to the first headset, and at 618, authorization to pair the first headset to the computing device is requested. For example, the pairing information may be transmitted to the first headset via Bluetooth, and the pairing information may be transmitted from the second headset to the first headset. The request for authorization may be, for example, a notification displayed on a screen of the smartphone and/or an audio request output via a speaker of the smartphone. At 620, it is determined whether authorization has been received. If authorization has not been received, the process loops back to step 618. If authorization has been received, then the process proceeds to step 622, where the first headset is paired to the computing device. For example, authorization may be received via an input at the computing device. The input may be, for example, one or more touch inputs received via a touchscreen of the computing device and/or a spoken confirmation received via a microphone of the computing device. The first headset may be, for example, paired to the smartphone via Bluetooth. At 624, the first headset and the second headset are caused to receive the same audio from the computing device. For example, the AirPods and the wireless earbuds receive the same song from the smartphone via Bluetooth. Accordingly, using a quick tap input, the user of the second headset can quickly share audio of the computing device with the user of the first headset.

Figure 7:
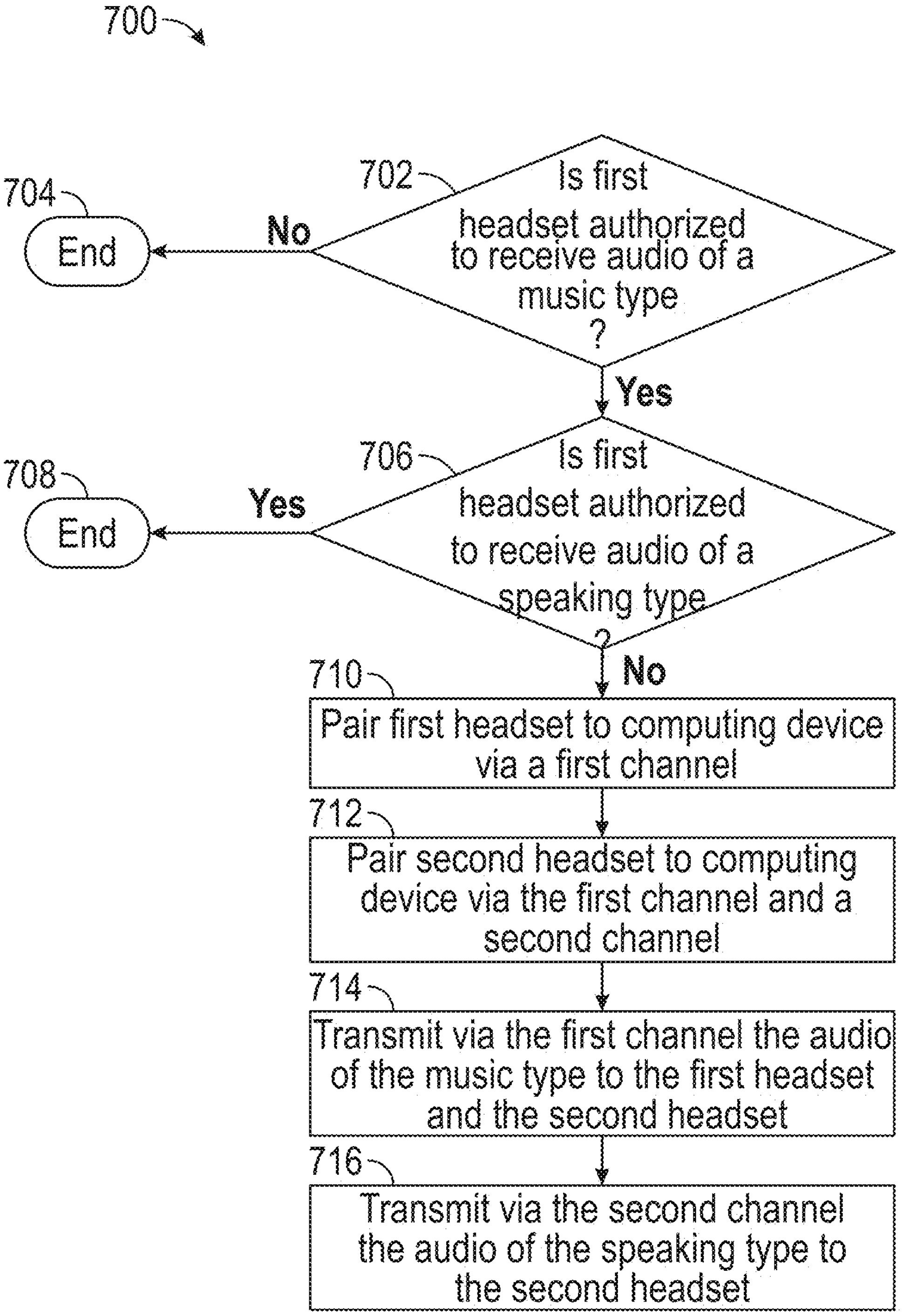
FIG. 7 shows another flowchart of illustrative steps for enabling audio sharing, in accordance with some embodiments of the disclosure.

FIG. 7 shows another flowchart of illustrative steps for enabling audio sharing, in accordance with some embodiments of the disclosure. Process 700 may be implemented, in whole or in part, on any of the computing devices mentioned herein. In addition, one or more actions of the process 700 may be incorporated into or combined with one or more actions of any other processes or embodiments described herein.

Step 702 typically follows a step wherein audio is being shared between two headsets; for example, step 702 would typically follow steps 522, 624, 830, 922 and/or 926 as described herein. At step 702, it is determined whether the first headset is authorized to receive audio of a music type. In other examples, it may be determined whether the first headset is authorized to receive audio of a first type including, for example, movie audio, podcast audio, audio tagged as low priority and/or audio tagged as public. The audio may be tagged, for example, via metadata associated with the audio. For example, this determination may refer to a user setting that is set at the computing device transmitting the audio. The user setting may indicate which types of audio are to be shared with a secondary headset and/or a headset that is connected via a tap event. If the first headset is not authorized to receive audio of the music, or first, type, then the process proceeds to step 704, where the process ends. If, at step 702, it is determined that the first headset is authorized to receive audio of the music, or first, type, then the process proceeds to step 706, where it is determined whether the first headset is authorized to receive audio of a speaking type. In other examples, it may be determined whether the first headset is authorized to receive audio of a second type different from the first type including, for example, audio from a phone call, audio tagged as high priority and/or audio tagged as private. A type of audio may be determined via metadata associated with the audio and/or via an application associated with the audio (e.g., a phone application or a music streaming application). In some examples, a trained model may be utilized to determined whether audio is of a speaking type or a music type. Speaking may comprise a phone call and/or a podcast. Music may comprise an instrumental component. If, at step 706, it is determined that the first headset is not authorized to receive audio of the speaking (or second) type, then the process proceeds to step 708, where the process ends. If, at step 706, it is determined that the first headset is authorized to receive audio of the speaking, or second, type, then the process proceeds to step 710, where the first headset is paired to the computing device via a first channel. For example, the first headset may be paired to the computing device via a first Bluetooth channel. At 712, the second headset is paired to computing device via the first channel and a second channel. For example, the first headset may be paired to the computing device via the first Bluetooth channel and a second Bluetooth channel that is different from the first Bluetooth channel. At 714, the audio of the music, or first, type is transmitted to the first headset and the second headset via the first channel. At 716, the audio of the speaking type is transmitted to the second headset via the second channel. In this manner, audio, such as music, can be shared with the first headset, but private audio, such as a phone call, can be kept private by transmitting it to only the second headset.

Figure 8:
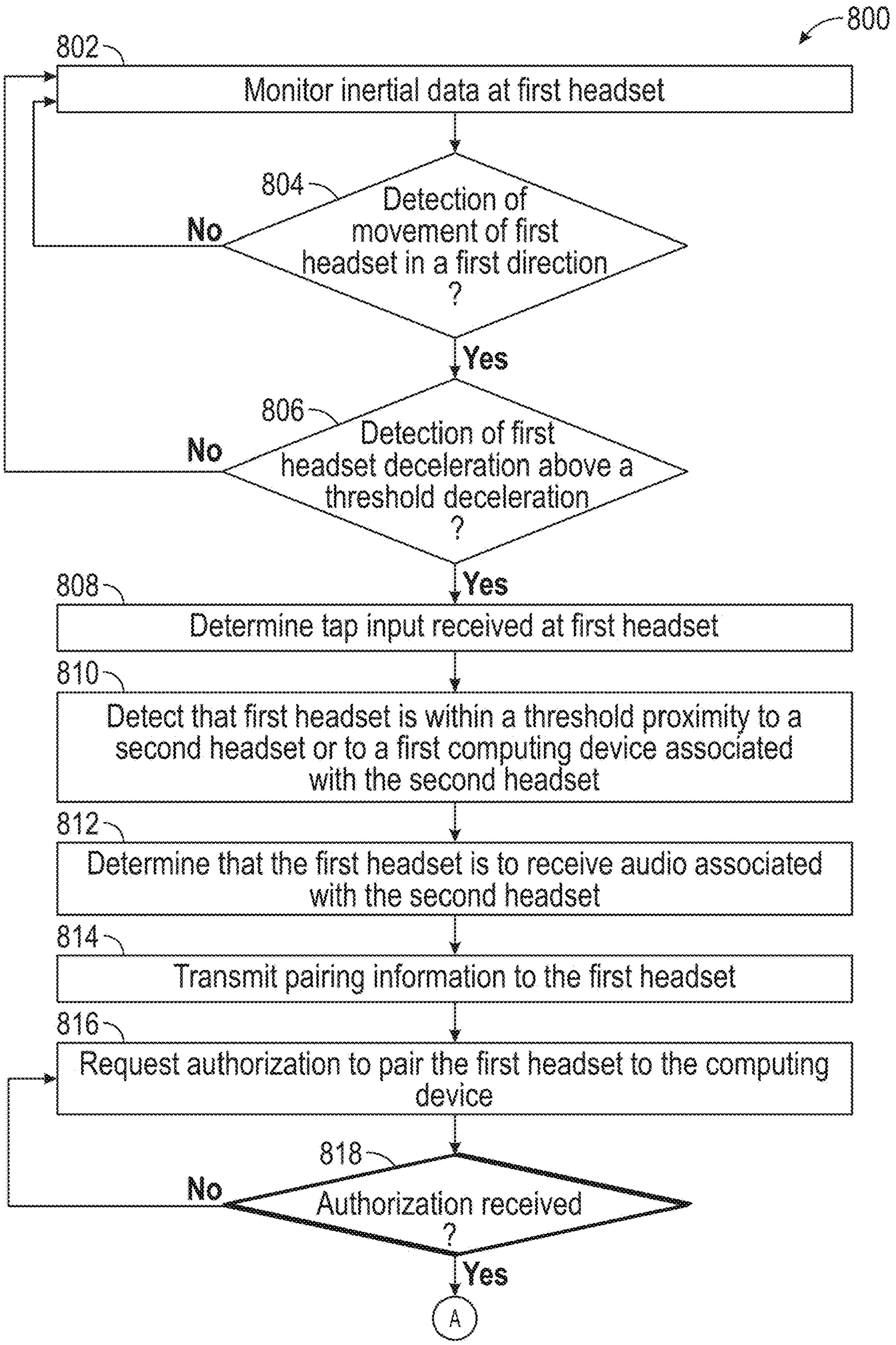
FIG. 8 shows another flowchart of illustrative steps for enabling audio sharing, in accordance with some embodiments of the disclosure.
Figure 8:
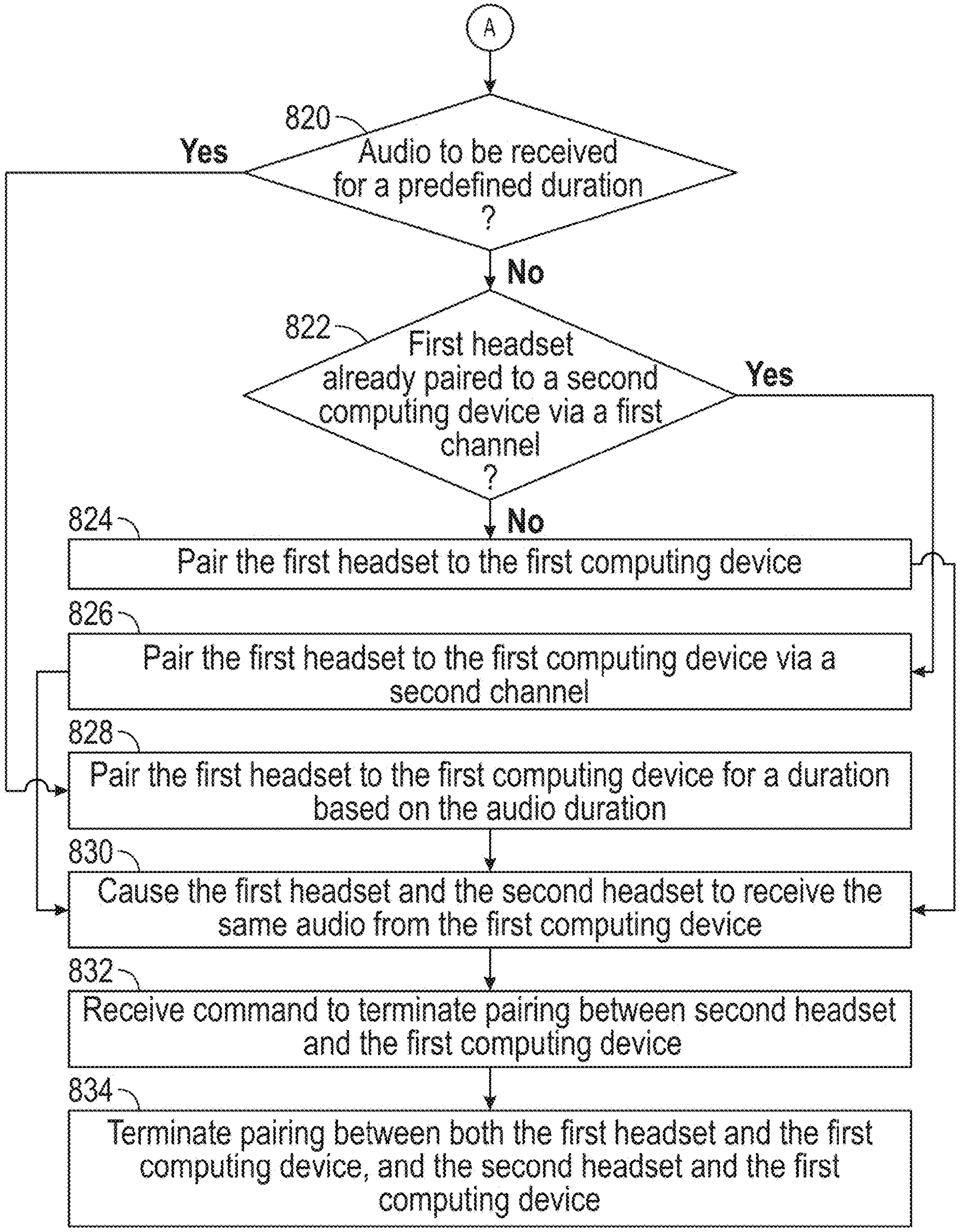

FIG. 8 shows another flowchart of illustrative steps for enabling audio sharing, in accordance with some embodiments of the disclosure. Process 800 may be implemented, in whole or in part, on any of the computing devices mentioned herein. In addition, one or more actions of the process 800 may be incorporated into or combined with one or more actions of any other processes or embodiments described herein.

At step 802, inertial data is monitored at a first headset, for example, via an accelerometer located within at least one headphone of the first headset. The first headset may comprise, for example, a pair of AirPods. At 804, it is detected whether there has been a movement of the first headset in a first direction; for example, it is detected whether there has been a movement of a first headphone of the first headset. If no movement is detected, then the process loops back to step 802. If movement is detected, then the process proceeds to step 806, where it is detected whether a deceleration of the first headset is above a threshold deceleration, for example, it is detected whether there has been a deceleration of the first headphone above the threshold deceleration. If no deceleration above the threshold deceleration is detected, then the process loops back to 802. If a deceleration above the threshold deceleration is detected, then the process proceeds to step 808, where it is determined that a tap input has been received at the first headset. At 810, it is detected that the first headset (and/or a first headphone of the first headset) is within a threshold proximity to a second headset (and/or a first headphone of the second headset) or to a first computing device, such as a first smartphone, associated with the second headset. The second headset may comprise, for example, a pair of wireless earbuds. The proximity detection may take place, for example, via NFC. At 812, it is determined that the first headset is to receive audio associated with the second headset, for example, a song that is playing through the second headset that is being received from the first computing device via, for example, Bluetooth.

At 814, pairing information is transmitted to the first headset, and at 816, authorization to pair the first headset to the first computing device is requested. For example, the pairing information may be transmitted to the first headset via Bluetooth, and the pairing information may be transmitted from the second headset to the first headset. The request for authorization may be, for example, a notification displayed on a screen of the first smartphone and/or an audio request output via a speaker of the first smartphone. At 818, it is determined whether authorization has been received. For example, authorization may be received via an input at the first computing device. The input may be, for example, one or more touch inputs received via a touchscreen of the first computing device and/or a spoken confirmation received via a microphone of the first computing device. If authorization has not been received, the process loops back to step 816. If authorization has been received, then the process proceeds to step 820, where it is determined whether the audio to be received is of a predefined duration. It may be determined, for example, that the audio is to be shared only for the duration of a song. This may be indicated, for example, via an input received at the first computing device selecting a "share audio for length of song" option. If it is determined that the audio is not to be received for a predefined duration, then the process proceeds to step 822. If it is determined that the audio is to be received for a predefined duration (i.e., the audio is to be received indefinitely), then the process proceeds to step 828.

At step 822, it is determined whether the first headset is already paired to a second computing device via a first channel. The first headset may, for example, be paired to a second smartphone belonging to the first user. If it is determined that the first headset is not paired to a second computing device via the first channel, then the process proceeds to step 824, where the first headset is paired to the first computing device. In another example, the first headset may be paired to the second computing device, but may not be active. In this example, the process also proceeds to step 824. The first headset may be, for example, paired to the first smartphone via Bluetooth. The process then proceeds to step 830. If it is determined that the first headset is paired to a second computing device via the first channel, then the process proceeds to step 826, where the first headset is paired to the computing device via a second channel. The first headset may be, for example, paired to the smartphone via a second Bluetooth channel. The process then proceeds to step 830.

At step 828, the first headset is paired to the first computing device for a duration based on the audio duration. An application may, for example, automatically terminate the pairing once a song, podcast or limited-duration program finishes. At 830, the first headset and the second headset are caused to receive the same audio from the first computing device. For example, the AirPods and the wireless earbuds receive the same song from the smartphone via Bluetooth. The process then proceeds to step 832, where a command to terminate the pairing between the second headset and the first computing device is received. This may, for example, be in response to an input received at the first computing device. At 834, both the pairing between the first headset and the first computing device and the pairing between second headset and the first computing device are terminated. In this manner, the sharing session is terminated automatically when a user of the first computing device, for example, disconnects their headset.

Figure 9:
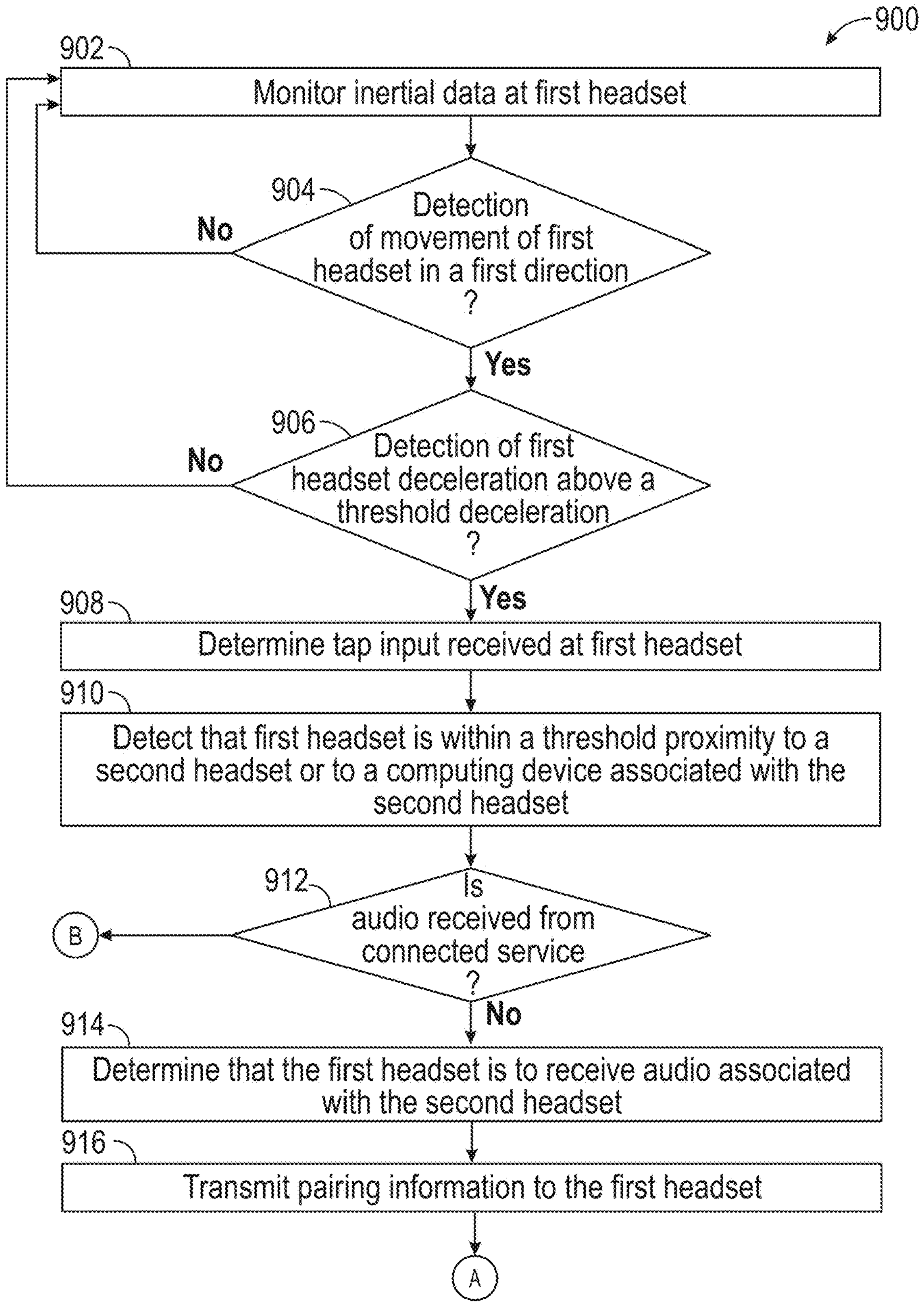
FIG. 9 shows another flowchart of illustrative steps for enabling audio sharing, in accordance with some embodiments of the disclosure.
Figure 9:
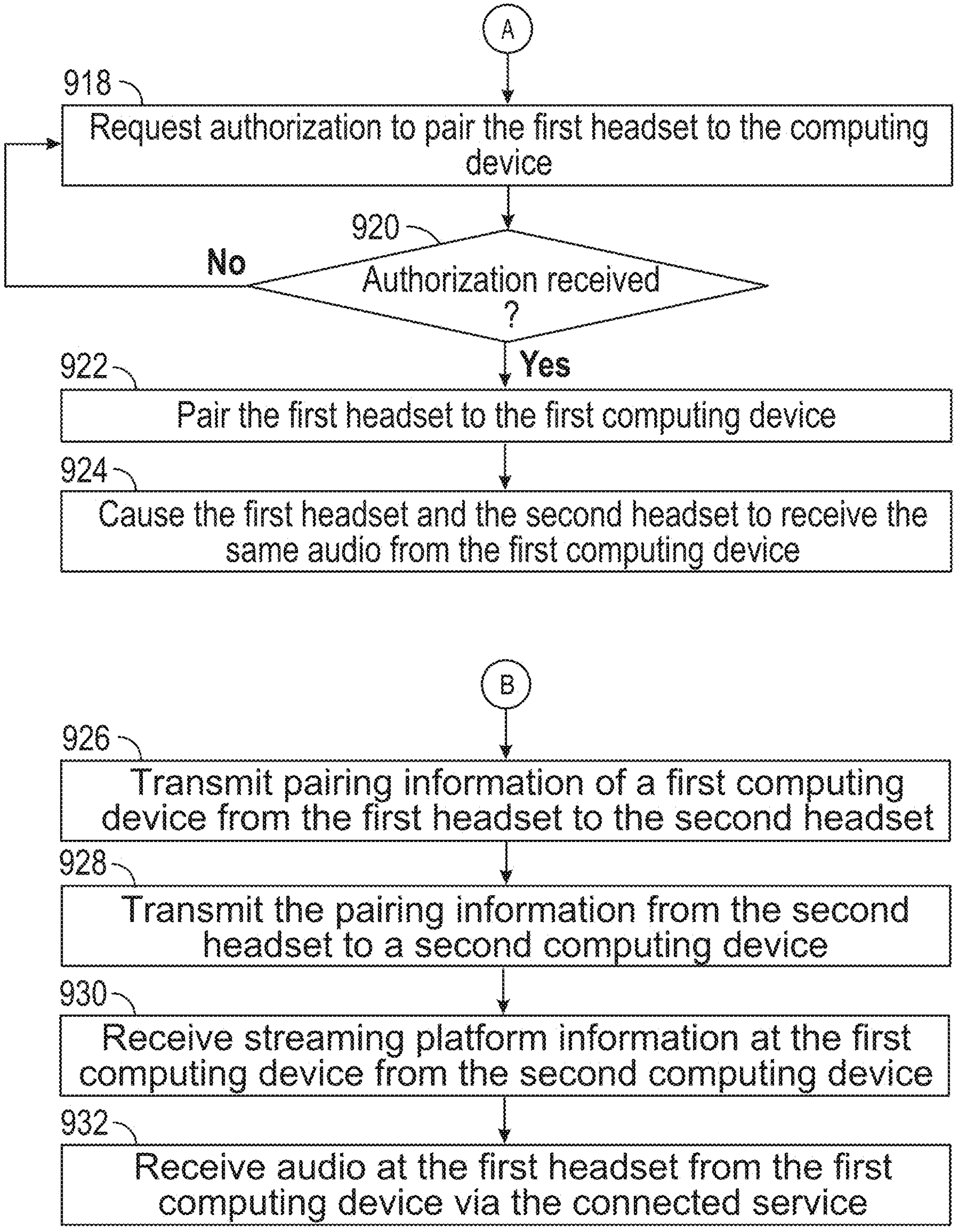

FIG. 9 shows another flowchart of illustrative steps for enabling audio sharing, in accordance with some embodiments of the disclosure. Process 900 may be implemented, in whole or in part, on any of the computing devices mentioned herein. In addition, one or more actions of the process 900 may be incorporated into or combined with one or more actions of any other processes or embodiments described herein.

At step 902, inertial data is monitored at a first headset, for example, via an accelerometer located within at least one headphone of the first headset. The first headset may comprise, for example, a pair of AirPods. At 904, it is detected whether there has been a movement of the first headset in a first direction; for example, it is detected whether there has been a movement of a first headphone of the first headset. If no movement is detected, then the process loops back to step 902. If movement is detected, then the process proceeds to step 906, where it is detected whether a deceleration of the first headset is above a threshold deceleration; for example, it is detected whether there has been a deceleration of the first headphone above the threshold deceleration. If no deceleration above the threshold deceleration is detected, then the process loops back to 902. If a deceleration above the threshold deceleration is detected, then the process proceeds to step 908, where it is determined that a tap input has been received at the first headset. At 910, it is detected that the first headset (and/or a first headphone of the first headset) is within a threshold proximity to a second headset (and/or a first headphone of the second headset) or to a computing device, such as a smartphone, associated with the second headset. The second headset may comprise, for example, a pair of wireless earbuds. The proximity detection may take place, for example, via NFC. At 912 it is determined whether the audio is received from a connected service, such as a connected audio service. In some examples, a user may be using a connected service, such as a music streaming app, (e.g., Apple Music), to stream music via a network, such as the internet, to their smartphone.

If, at 912, it is determined that the audio is not received via a connected service, then the process proceeds to step 914, where it is determined that the first headset is to receive audio associated with the second headset. For example, a song that is playing through the second headset that is being received from the computing device via, for example, Bluetooth.

At 916, pairing information is transmitted to the first headset, and at 918, authorization to pair the first headset to the computing device is requested. For example, the pairing information may be transmitted to the first headset via Bluetooth, and the pairing information may be transmitted from the second headset to the first headset. The request for authorization may be, for example, a notification displayed on a screen of the smartphone and/or an audio request output via a speaker of the smartphone. At 920, it is determined whether authorization has been received. If authorization has not been received, the process loops back to step 918. If authorization has been received, then the process proceeds to step 922, where the first headset is paired to the computing device. For example, authorization may be received via an input at the computing device. The input may be, for example, one or more touch inputs received via a touch-screen of the computing device and/or a spoken confirmation received via a microphone of the computing device. The first headset may be, for example, paired to the smartphone via Bluetooth. The process proceeds to step 924, where the first headset and the second headset are caused to receive the same audio from the computing device. For example, the AirPods and the wireless earbuds receive the same song from the smartphone via Bluetooth.

If, at 912, it is determined that the audio is received via a connected service, such as a streaming platform, then the process proceeds to step 926, where the first headset to transmits pairing information, such as Bluetooth pairing information, of a first computing device to the second headset via, for example, NFC. In this example, a second computing device is utilized to stream audio from a connected service, such as a streaming platform, and transmit the audio to the second headset. At 928, the second headset transmits, for example via Bluetooth, the pairing information to the second computing device. At 930, the second computing device and the first computing device establish a connection, such as an ad-hoc Bluetooth connection, based on the received pairing information, and the two computing devices use that connection to exchange connected service information, such as login information for a streaming platform, with the first computing device receiving the streaming information from the second computing device. In some examples, if the first computing device does not have an account with that streaming service, the second computing device may generate an ephemeral authorization token to grant temporary access. This may be limited, for example, to a current song being played, a playlist, an album and/or limited by time (e.g., for the next 10 minutes). At 932, audio is received at the first headset via the first computing device. For example, the first computing device uses the received connected service information to receive the audio from a server, for example an Apple Music server, associated with the connected service.

Figure 10:
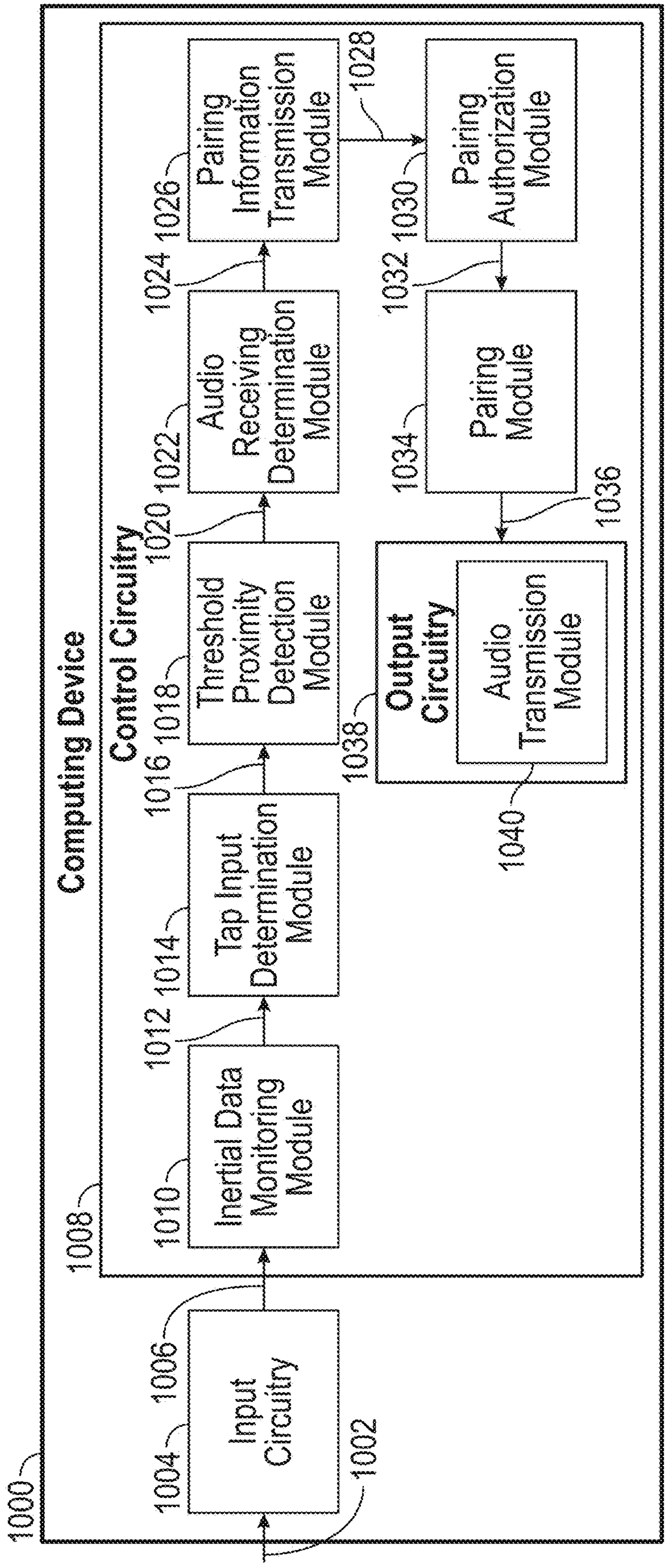
FIG. 10 shows a block diagram representing components of a computing device and dataflow therebetween for enabling audio sharing, in accordance with some embodiments of the disclosure.

FIG. 10 shows a block diagram representing components of a computing device and dataflow therebetween for enabling audio sharing, in accordance with some embodiments of the disclosure. Computing device 1000 comprises input circuitry 1004, control circuitry 1008 and output circuitry 1038. The computing device 1000 may be, for example, a smart phone. Control circuitry 1008 may be based on any suitable processing circuitry (not shown) and comprises control circuits and memory circuits, which may be disposed on a single integrated circuit or may be discrete components and processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i9 processors) or multiple different processors (e.g., an Intel Core i5 processor and an Intel Core i7 processor) and/or a system on a chip (e.g., a Qualcomm Snapdragon 888). Some control circuits may be implemented in hardware, firmware, or software.

First input is received 1002 by the input circuitry 1004. The input circuitry 1004 is configured to receive inputs related to a computing device. For example, this may be via a touchscreen of a smart phone. In other examples, the input may be received via an infrared controller, a Bluetooth and/or Wi-Fi controller of the computing device 1000, a keyboard, a mouse and/or a microphone. In another example, this may be via a gesture detected via an extended reality device. In a further example, the input may comprise instructions received via another computing device. The input circuitry 1004 transmits 1006 the user input to the control circuitry 1008.

The control circuitry 1008 comprises an inertial data monitoring module 1010, a tap input determination module 1014, a threshold proximity detection module 1018, an audio receiving determination module 1022, a pairing information transmission module 1026, a pairing authorization module 1030, a pairing module 1034 and output circuitry 1038 comprising an audio transmission module 1040. The input is transmitted 1006 to the inertial data monitoring module, where it is determined if a movement of a first headset in a first direction and a subsequent deceleration of the first headset above a threshold deceleration are detected, for example, based on accelerometer data. If the movement and subsequent deceleration above the threshold are detected at the inertial data monitoring module 1010, an indication is transmitted 1012 to the tap input determination module 1014, where it is determined that a tap event has been received at the first headset. An indication is transmitted 1016 to the threshold proximity detection module 1018, where it is detected that the first headset is within a threshold proximity to a second headset or to a computing device associated with the second headset, for example, via NFC. If it is detected that the first headset is within the threshold proximity to the second headset, then an indication is transmitted 1020 to the audio receiving determination module 1022, where it is determined, based on a predetermined factor, whether the first headset is to receive audio associated with the second headset. If it is determined that the first headset is to receive audio associated with the second headset, then an indication is transmitted 1024 to the pairing information transmission module 1026, which transmits pairing information to the first headset. An indication is transmitted 1028 to the pairing authorization module 1030, which requests and receives authorization to pair the first headset to the computing device. On receiving authorization at the pairing authorization module 1030, an indication is transmitted 1032 to the pairing module 1034, which pairs the first headset to the computing device, for example, via Bluetooth. An indication 1036 is transmitted to the output circuitry 1038, where the audio transmission module 1040 causes the same audio to be transmitted to the first and second headsets.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be illustrative and not limiting. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
monitoring, at a first headset, inertial data;
determining that the first headset has received a tap input, wherein the determining comprises detecting:
based on the inertial data, a movement of the first headset in a first direction; and
based on the inertial data, a subsequent deceleration of the first headset, wherein the deceleration is above a threshold deceleration; and
based on determining the tap input:
detecting, at the first headset, that the first headset is within a threshold proximity to a second headset or to a computing device associated with the second headset;
determining, based on a predetermined factor, that the first headset is to receive audio associated with the second headset;
transmitting, to the first headset, pairing information;
requesting, at the respective second headset or computing device, authorization to pair the first headset to the computing device;
receiving, at the respective second headset or computing device, the authorization to pair the first headset to the computing device;
pairing, using the pairing information, the first headset to the computing device; and
causing the first headset and the second headset to receive the same audio from the computing device.

2. The method of claim 1, wherein:
transmitting the pairing information to the first headset further comprises transmitting, via near field communication (NFC), the pairing information to the first headset from the second headset; and
pairing the first headset to the computing device further comprises pairing the first headset to the computing device via a Bluetooth connection.

3. The method of claim 1, wherein detecting that the first headset is within the threshold proximity to the second headset further comprises detecting NFC associated with the second headset.

4. The method of claim 1, wherein the first headset comprises a pair of headphones and, in response to receiving the tap input, the method further comprises:
identifying that a first headphone of the pair of headphones has tapped a second headphone of the pair of headphones; and
in response to identifying that the first headphone of the pair of headphones has tapped a second headphone of the pair of headphones:
not performing any subsequent steps of the method.

5. The method of claim 1, wherein:
the audio comprises audio of a music type and audio of a speaking type; and
causing the first headset and the second headset to receive the same audio from the computing device further comprises:
identifying that the first headset is authorized to receive audio of the music type and not of the speaking type;

causing the first headset to receive the audio of the music type;
causing the first headset to not receive the audio of the speaking type; and
causing the second headset to receive the audio of the music type and the speaking type.

6. The method of claim 5, wherein the method further comprises:
pairing the second headset to the computing device via a first channel and a second channel;
pairing the first headset to the computing device via the first channel;
transmitting, via the first channel, the audio of the music type to the first headset and to the second headset; and
transmitting, via the second channel, the audio of the speaking type to the second headset.

7. The method of claim 1, wherein pairing the first headset to the computing device further comprises:
identifying that the audio comprises a portion that has a predefined duration; and
limiting a pairing duration of the first headset to the computing device to the predefined duration of the portion.

8. The method of claim 1, wherein the second headset is paired to the computing device, and the method further comprises:
receiving a command to terminate the pairing between the second headset and the computing device; and
in response to receiving the command, terminating the pairing between both the first headset and the computing device and the second headset and the computing device.

9. The method of claim 1, wherein:
the computing device is a second computing device;
the first headset is paired to a first computing device via a first channel; and
pairing the first headset to the first computing device further comprises pairing the first headset to the second computing device via a second channel between the first headset and the second computing device.

10. The method of claim 1, wherein causing the first headset and the second headset to receive the same audio from the computing device further comprises:
initiating a connection between the first headset and a server associated with a connected service; and
receiving the audio at the first headset via a server associated with the connected service rather than receiving the audio directly from the second headset or the computing device.

11. A system comprising:
input/output circuitry configured to:
monitor, at a first headset, inertial data;
processing circuitry configured to:
determine that the first headset has received a tap input, wherein the determining comprises detecting
based on the inertial data, a movement of the first headset in a first direction; and
based on the inertial data, a subsequent deceleration of the first headset, wherein the deceleration is above a threshold deceleration; and
in response to determining the tap input:
detect, at the first headset, that the first headset is within a threshold proximity to a second headset or to a computing device associated with the second headset;

determine, based on a predetermined factor, that the first headset is to receive audio associated with the second headset;

transmit, to the first headset, pairing information;

request, at the respective second headset or computing device, authorization to pair the first headset to the computing device;

receive, at the respective second headset or computing device, the authorization to pair the first headset to the computing device;

pair, using the pairing information, the first headset to the computing device; and cause the first headset and the second headset to receive the same audio from the computing device.

12. The system of claim 11, wherein:

the processing circuitry configured to transmit the pairing information to the first headset is further configured to transmit, via near field communication (NFC), the pairing information to the first headset from the second headset; and the processing circuitry configured to pair the first headset to the computing device is further configured to pair the first headset to the computing device via a Bluetooth connection.

13. The system of claim 11, wherein the processing circuitry configured to detect that the first headset is within the threshold proximity to the second headset is further configured to detect NFC associated with the second headset.

14. The system of claim 11, wherein the first headset comprises a pair of headphones and, in response to receiving the tap input, the processing circuitry is further configured to:

identify that a first headphone of the pair of headphones has tapped a second headphone of the pair of headphones; and in response to identifying that the first headphone of the pair of headphones has tapped a second headphone of the pair of headphones:

stop performing actions in response to receiving the tap input.

15. The system of claim 11, wherein:

the audio comprises audio of a music type and audio of a speaking type; and the processing circuitry configured to cause the first headset and the second headset to receive the same audio from the computing device is further configured to:

identify that the first headset is authorized to receive audio of the music type and not of the speaking type;

cause the first headset to receive the audio of the music type;

cause the first headset to not receive the audio of the speaking type; and cause the second headset to receive the audio of the music type and the speaking type.

16. The system of claim 15, wherein the system further comprises processing circuitry configured to:

pair the second headset to the computing device via a first channel and a second channel;

pair the first headset to the computing device via the first channel;

transmit, via the first channel, the audio of the music type to the first headset and to the second headset; and transmit, via the second channel, the audio of the speaking type to the second headset.

17. The system of claim 11, wherein the processing circuitry configured to pair the first headset to the computing device is further configured to:

identify that the audio comprises a portion that has a predefined duration; and limit a pairing duration of the first headset to the computing device to the predefined duration of the portion.

18. The system of claim 11, wherein the second headset is paired to the computing device, and the system further comprises processing circuitry configured to:

receive a command to terminate the pairing between the second headset and the computing device; and in response to receiving the command, terminate the pairing between both the first headset and the computing device and the second headset and the computing device.

19. The system of claim 11, wherein:

the computing device is a second computing device;

the first headset is paired to a first computing device via a first channel; and the processing circuitry configured to pair the first headset to the first computing device is further configured to pair the first headset to the second computing device via a second channel between the first headset and the second computing device.

20. The system of claim 11, wherein the processing circuitry configured to cause the first headset and the second headset to receive the same audio from the computing device is further configured to:

initiate a connection between the first headset and a server associated with a connected service; and receive the audio at the first headset via a server associated with the connected service rather than receiving the audio directly from the second headset or the computing device.

* * * * *